US012058256B2

(12) United States Patent
Roper et al.

(10) Patent No.: US 12,058,256 B2
(45) Date of Patent: Aug. 6, 2024

(54) SYSTEM AND METHOD FOR PROVIDING A SECURE LOCALLY-BASED BOOT DISK ENCRYPTION KEY

(71) Applicant: NCR Corporation, Atlanta, GA (US)

(72) Inventors: Anthony Edward Roper, Dundee (GB); Kerry E. Archibald, Dundee (GB); Gameelah Ghafoor, Dundee (GB)

(73) Assignee: NCR Alleos Corporation, Atlanta, GA (US)

( * ) Notice: Subject to any disclaimer, the term of this patent is extended or adjusted under 35 U.S.C. 154(b) by 258 days.

(21) Appl. No.: 17/671,729

(22) Filed: Feb. 15, 2022

(65) Prior Publication Data

US 2023/0261866 A1 Aug. 17, 2023

(51) Int. Cl.
*H04L 9/08* (2006.01)
*G06F 21/57* (2013.01)
*G06F 21/60* (2013.01)
*G06F 21/80* (2013.01)

(52) U.S. Cl.
CPC .......... *H04L 9/0894* (2013.01); *G06F 21/575* (2013.01); *G06F 21/602* (2013.01); *G06F 21/80* (2013.01); *H04L 9/085* (2013.01); *H04L 9/0891* (2013.01); *H04L 2209/08* (2013.01); *H04L 2209/16* (2013.01)

(58) Field of Classification Search
USPC ....................................................... 713/189
See application file for complete search history.

(56) References Cited

U.S. PATENT DOCUMENTS

| | | | |
|---|---|---|---|
| 10,013,561 B2 | 7/2018 | Ghafoor et al. | |
| 10,412,098 B2 * | 9/2019 | Campagna | ............ H04L 9/3234 |
| 10,467,418 B2 | 11/2019 | Ghafoor et al. | |
| 10,489,603 B2 * | 11/2019 | Manoharan | ........... H04L 9/0863 |
| 10,503,894 B2 | 12/2019 | Veltman | |
| 10,681,036 B2 | 6/2020 | Horgan et al. | |
| 10,862,898 B2 | 12/2020 | Hecker et al. | |
| 11,050,712 B2 * | 6/2021 | Touboul | ................ H04W 12/12 |

(Continued)

FOREIGN PATENT DOCUMENTS

| | | | | |
|---|---|---|---|---|
| CN | 105339890 A * | 2/2016 | .......... | G06F 11/1469 |
| EP | 3163492 A1 * | 5/2017 | ........... | G06F 21/575 |

*Primary Examiner* — Sakinah White Taylor
(74) *Attorney, Agent, or Firm* — Notaro, Michalos & Zaccaria P.C.; John S. Economou

(57) ABSTRACT

A system and method for operating a terminal such as an automated teller machine or other type of self-service terminal having a primary partition of a hard disk encrypted with a disk encryption key (DEK). At the initial installation and after every boot, a pre-boot manager encrypts the DEK with a new key encryption key (KEK) and then splits the encrypted DEK into a plurality of encrypted DEK parts. The pre-boot manager next stores the plurality of encrypted DEK parts in randomized storage locations on an unallocated portion of a hard disk and encrypts a list of the randomized storage locations of the plurality of encrypted DEK parts with the KEK and storing the encrypted list in a location on the unallocated portion of the hard disk. Finally, the pre-boot manager stores the KEK, optionally in an obfuscated format, in a location on the unallocated portion of the hard disk.

15 Claims, 4 Drawing Sheets

(56) References Cited

U.S. PATENT DOCUMENTS

| | | | |
|---|---|---|---|
| 2009/0319806 A1* | 12/2009 | Smith | G06F 21/575 |
| | | | 726/19 |
| 2010/0023739 A1* | 1/2010 | Levit-Gurevich | G06F 21/53 |
| | | | 718/1 |
| 2012/0151223 A1* | 6/2012 | Conde Marques | |
| | | | G06F 21/6218 |
| | | | 713/193 |
| 2015/0293857 A1* | 10/2015 | Cope | H04L 9/0894 |
| | | | 713/193 |
| 2017/0104736 A1* | 4/2017 | Seul | H04L 63/0428 |
| 2017/0124329 A1* | 5/2017 | Ghafoor | G06F 21/575 |
| 2017/0230179 A1* | 8/2017 | Mannan | H04L 9/3226 |
| 2018/0285842 A1 | 10/2018 | Guntupalli | |
| 2018/0337778 A1* | 11/2018 | Scheiblauer | H04L 9/0866 |
| 2021/0279357 A1* | 9/2021 | Das | G06F 16/24526 |

\* cited by examiner

SYSTEM AND METHOD FOR PROVIDING A SECURE LOCALLY-BASED BOOT DISK ENCRYPTION KEY

FIELD

This disclosure relates generally to a system and method for providing a secure locally-based boot disk encryption key, and more particularly relates to a secure system and method which does not require access to a key or portion of a key located in a remote location in order to boot a system having an encrypted boot disk.

BACKGROUND

Automated teller machines (ATMs) (and other self-service terminals or SSTs) are designed to be highly secure devices since they handle consumer financial transactions. However, ATMs and SSTs can be susceptible to malware, viruses, and eavesdropping just like any other device having memory and processor capabilities.

Moreover, an ATM can be especially lucrative to any eavesdropper capable of compromising the ATM execution environment. An ATM is not only loaded with currency, but also handles financial account information for consumers. Still further, the ATM has access to a secure financial network that can access many different financial institutions and likely has access to a branch server that interfaces over a separate network connection with the ATM's core banking system. ATMs may also be networked to one another within a bank branch. Thus, a compromised ATM could potentially create security issues for many customers and many financial institutions.

One technique for ensuring security is to encrypt an ATM's hard drive and store the encryption key on a remote server, on the hard drive itself in a designated hidden area of the hard drive that is not encrypted, or using a Trusted Platform Module ("TPM") to store the encryption key. On ATM boot the encryption key is obtained from the server, the designated area on the hard drive, or the TPM and is then used to decrypt the operating system (OS) from the hard drive. Then, when the OS is loaded, the encryption key is passed to the OS and the OS decrypts the hard drive as needed during operation of the ATM.

An issue with storing the encryption key on a remote server is that often ATMs can experience network bandwidth or connectivity issues with the network connection between the remote server holding the encryption key and the ATM, which means that obtaining the key may be impossible or too time consuming due to bandwidth issues. But, the ATM may still have good connectivity to its financial switch network and/or local bank branch server, which means that but for the inability to obtain the encryption key from the remote server, the ATM could be operational for customer use.

An issue with storing the encryption key on the hard drive in a designated unencrypted area of the hard drive is that should that key be identified and compromised, the entire ATM hard drive may need to be re-encrypted with a new encryption key. The process of encrypting an entire hard drive for an ATM is a time consuming process and is usually only done once at the time of initial installation.

An issue with storing the encryption key using a TPM is that this may not be completely secure in environments where supervision is not possible at all times, i.e., in environments where ATMs and other self-service terminals are typically located, and bad actors could be able to gain access to the hardware within the ATM and identify the encryption key. This is because a bad actor could use low-cost hardware to monitor the signal lines for the TPM hardware within the ATM. in an attempt to identify the encryption key.

Accordingly, there is a need for an improved system and method for storing encryption keys for an encrypted ATM hard disk which overcomes the foregoing problems.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure provides a system and method of storing encryption keys locally at an unsupervised ATM (or SST) which is less predictable and therefore much less susceptible to attack than prior solutions. Although the system and method of the present disclosure is specifically described with respect to implementation at an ATM, one of ordinary skill in the art will readily recognize that the disclosed system and method have application to any type of unattended self-service terminal.

Figure 1:
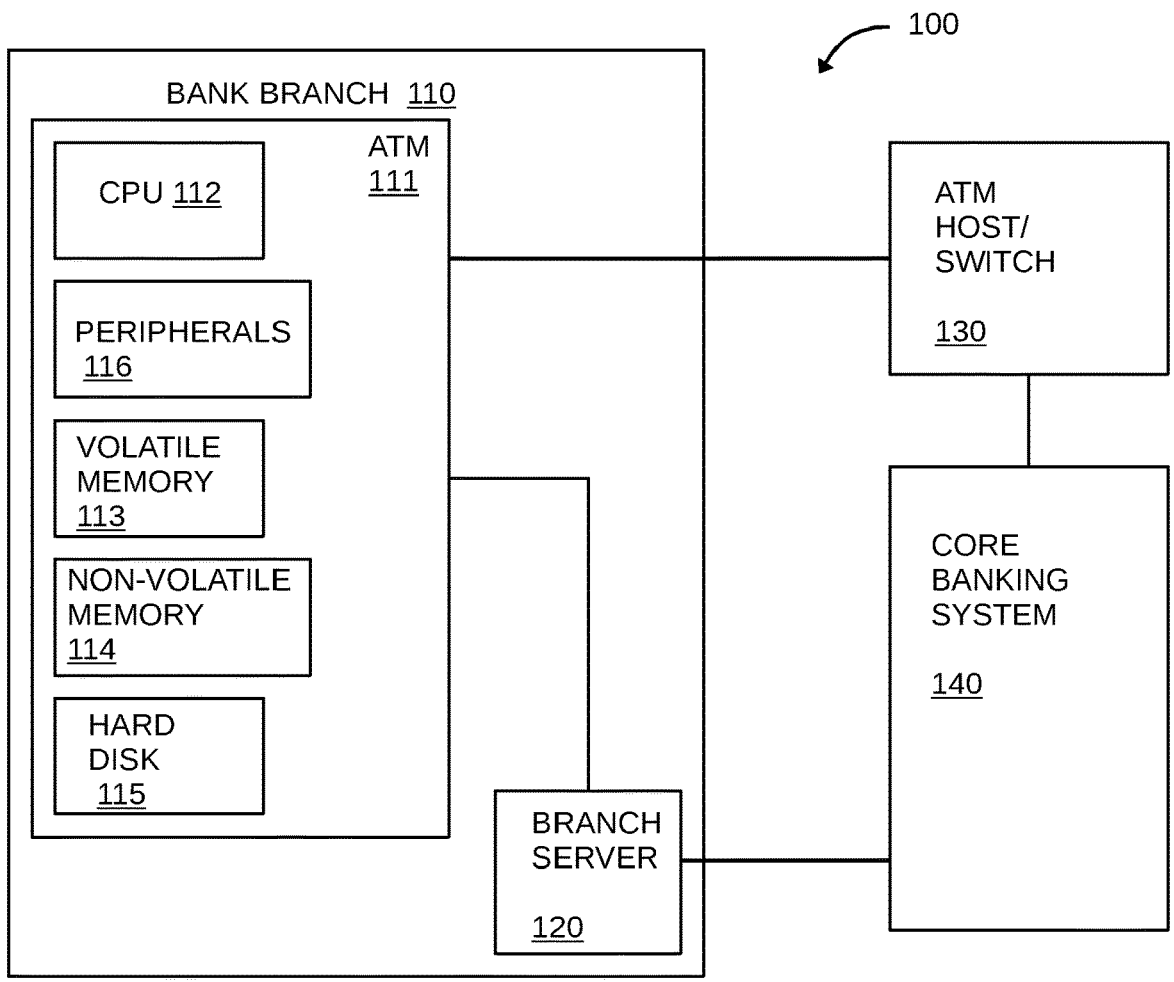
FIG. 1 is a block diagram of a dynamic pre-boot hard disk encryption key management system for an automated teller machine (ATM), according to an example embodiment.

Referring now to FIG. 1, a diagram is shown of a banking system 100 for providing a system and method for dynamic pre-boot hard disk encryption key management on an automated teller machine (ATM), according to an example embodiment. It is to be noted that the components are shown schematically in greatly simplified form, with only those components relevant to understanding of the embodiments being illustrated. The various components (that are identified in the FIG. 1) are illustrated and the arrangement of the components is presented for purposes of illustration only. It is to be noted that other arrangements with more or less components are possible without departing from the teachings of a system and method for dynamic pre-boot hard disk encryption key management presented herein.

The banking system 100 includes a bank branch 110, an ATM host/switch 130, and a core banking system 140. The bank branch 110 includes: an ATM 111 and a branch server 120. The ATM 111 includes one or more central processing units (processors) 112, volatile memory 113, non-volatile memory 114, a hard disk (HD) 115, and multiple peripheral devices 116. The non-volatile memory 114 includes a basic input/output system (BIOS) used to initiate a boot of the ATM 111. The HD 115 may be any type of non-volatile memory device (i.e., a non-transitory computer-readable storage medium) used to hold an operating system for a computer-based system and the term "hard disk" as used herein is intended to be broadly defined to include both electro-mechanical data storage devices and solid state drives.

Figure 2:
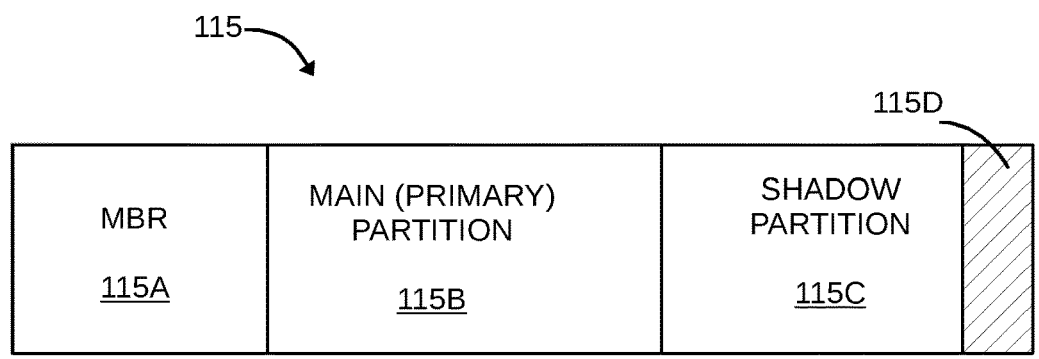
FIG. 2 is a block diagram of the partitioning of a hard disk used in the dynamic pre-boot hard disk encryption key management system of FIG. 1.

Referring now to FIG. 2, the HD 115 may include drivers, application code, stored data, and an operating system (OS) on a main (primary) partition 115B. This main partition 115B is the portion that is encrypted at the initial installation with a disk encryption key (DEK). The HD 115 also includes a master boot record (MBR) portion 115A, a shadow (hidden or unallocated) partition 115C, and may include additional un-partitioned space 115D. The MBR portion 115A holds the information on how the logical partitions, containing file systems, are organized. The MBR also contains executable code (the "boot loader") which functions as a loader for the operating system. The shadow partition 115C may be configured as a recovery partition or a partition holding diagnostic tools or data and is typically not recognized by or available to the operating system itself.

In a conventional scenario when the hard disk is not encrypted, the BIOS causes the boot loader to execute and load the operating system from the hard disk into volatile memory whenever the ATM is booted. Once the operating system is loaded into volatile memory, the ATM operates normally. In prior solutions involving an encrypted hard disk, the boot loader may either include a pre-boot manager or call a pre-boot manager from an unencrypted portion of the hard disk. Alternatively, the pre-boot manager may be part of the BIOS in the non-volatile memory. In either case, the code for the pre-boot manager is stored within a non-transitory computer-readable storage medium (i.e., either the hard disk or non-volatile memory). The pre-boot manager obtains the disk encryption key (DEK), as described above, and then decrypts and loads the operating system from an encrypted partition of the hard disk into the volatile memory for normal operation. The pre-boot manager may also provide the DEK to the operating system so that the operating system may access other information stored on the encrypted partition of the hard disk as necessary. The process for obtaining the DEK and the drawbacks of this type of system are discussed above in the Background section.

Figure 3:
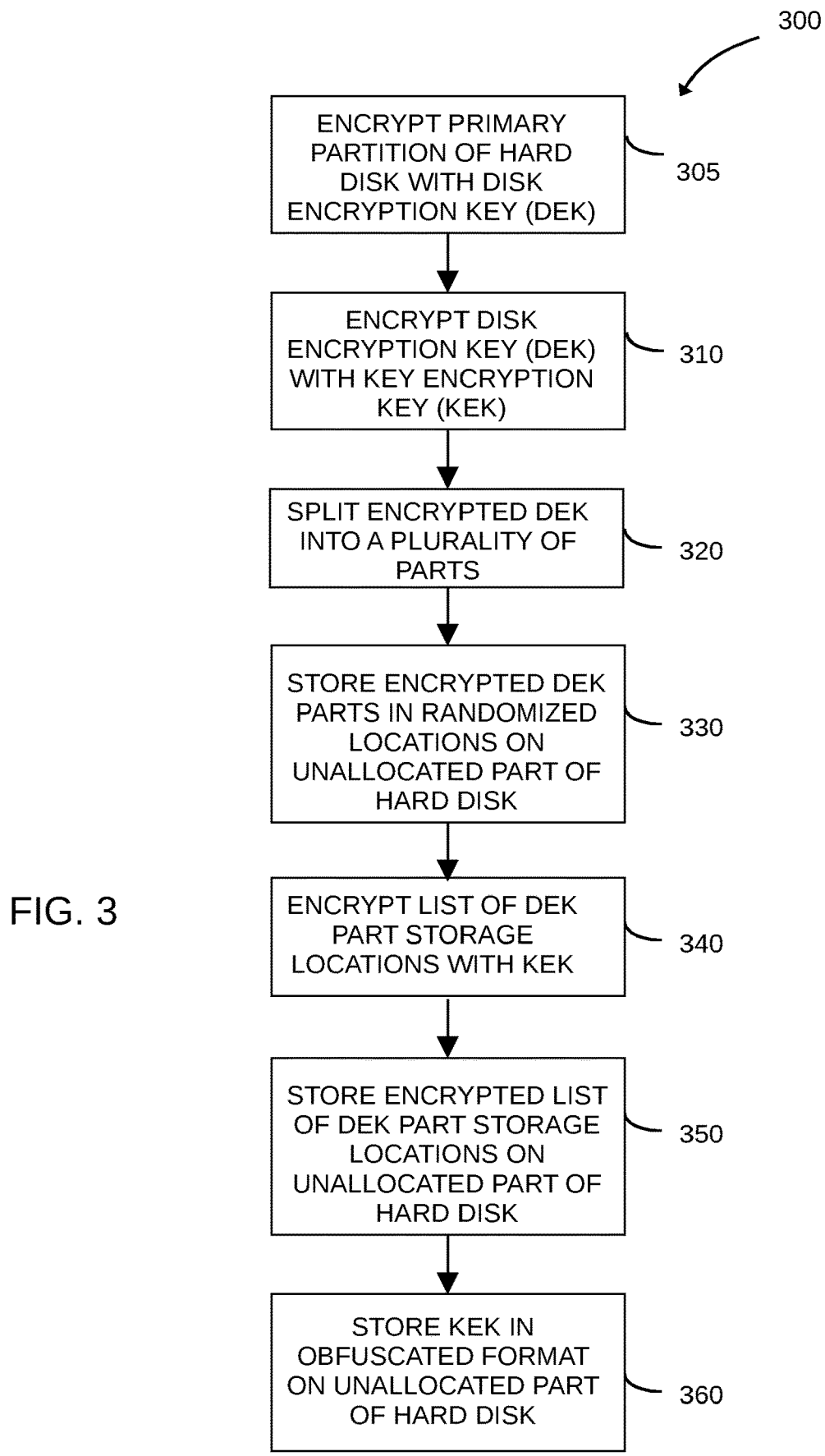
FIG. 3 is a flowchart of a method for the initial installation of the dynamic pre-boot hard disk encryption key management system of FIG. 1.

Referring now to FIG. 3, a flowchart 300 describes a method for securely storing the DEK performed by the dynamic pre-boot hard disk encryption key management system (pre-boot manager). As with prior solutions, the pre-boot manager may be part of the BIOS in the non-volatile memory 114, may be part of the boot loader in the MBR 115A, or may reside in the MBR 115A (or other non-encrypted part of HD 115) and be initiated by the boot loader. The primary partition of a hard disk such as HD 115 (the partition holding the operating system) of FIG. 1 is first encrypted using a predetermined DEK (step 305). Next, the DEK itself is encrypted with a key encryption key (KEK) at step 310 to generate an encrypted DEK. The encrypted DEK is split into a plurality of parts at step 320. The encrypted DEK parts are stored in randomized locations on an unallocated part of the hard disk at step 330. The unallocated parts of the hard disk may be, for example, within a hidden partition of hard disk, such as shadow partition 115C shown in FIG. 2. In the alternative, the unallocated portions may be within un-partitioned space 115D shown in FIG. 2. The storage location of each encrypted DEK part is recorded on a list. This list of encrypted DEK part locations is also encrypted using the KEK at step 340. This encrypted list is then stored on an unallocated part of hard disk at step 350 in the same manner as the storage of the DEK parts. Thereafter, the KEK itself may be stored in an obfuscated manner on an unallocated part of hard disk at step 360. Optionally, the obfuscated KEK may be split into parts for storage, in either predetermined locations or at randomized locations stored in a list which is also stored in an obfuscated manner on an unallocated part of hard disk. Methods of obfuscation for storage are known in the art.

The method 300 shown in FIG. 3 is performed upon the initial configuration of the ATM 111, i.e., upon installation of the operating system. In addition, certain steps, e.g., steps 310 to 360, may be performed at every boot as discussed below with respect to FIG. 5 in order to provide additional security. Storing the DEK in encrypted form and in parts on an unallocated part of the hard disk makes it much more difficult for any bad actor to gain access to the DEK than with prior art solutions which merely stored the DEK in whole and unencrypted on the disk. When steps 310 to 360 are repeated upon every boot, the obfuscation method (also referred to as an obfuscation format herein) used to obfuscate the KEK may optionally be changed every time a new value is stored on the hard disk, using a new salt or new form of obfuscation. The selection of the new salt or the new obfuscation method may be randomized as well, to provide further levels of security.

Figure 4A:
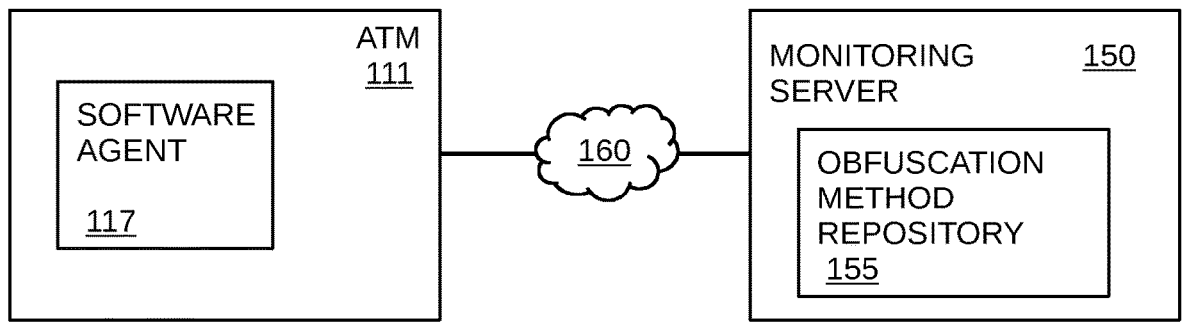
FIG. 4A is a block diagram of one further embodiment of the dynamic pre-boot hard disk encryption key management system of FIG. 1.

In a further embodiment of the banking system 100 of FIG. 1 that is shown in FIG. 4A, each ATM 111 may include a software agent 117 that runs in conjunction with the operating system of that ATM 111. The software agent 117 communicates with a remote monitoring server 150 via a connection to a network 160. The network 160 may be a wide area network, such as the Internet, or may be a private network. A virtual private network (VPN) may be implemented over the network to ensure privacy. The monitoring server 150 includes a repository 155 (e.g., a database or other type of stored data structure) that includes a number of different obfuscation methods for use in obfuscating the KEK. The obfuscation methods stored in the repository may be designed by user input, or may be generated based for example, on a predetermined algorithm or an algorithm created using machine learning. In this further embodiment, every time the ATM 111 completes a boot into its operating system, the software agent 117 requests a new obfuscation method from the monitoring server 150. In response, the monitoring server 150 forwards a randomly-selected obfuscation method from different obfuscation methods stored in the repository 155. The software agent 117 then replaces the then-existing obfuscation method with the newly-received obfuscation method (i.e., received from the monitoring server 150 after the successful boot) by, for example, injecting the newly-received method into the pre-boot manager. The newly-received obfuscation method is then be used to re-obfuscate the current KEK. The further embodiment shown in FIG. 4A is useful even for applications where the connection to network 160 is of a low-bandwidth nature, either due to stability or loading issues on the network, because the bandwidth needed to obtain a new obfuscation method is much less than that required to supply disk encryption keys. Since the different obfuscation methods available for use are stored in a common repository, this embodiment allows that provides an easy way to revoke the use of one of those methods by all the ATMs in a common network—i.e., by simply deleting it from the repository.

This may be necessary, for example, if a bad actor were able to compromise a particular obfuscation method at one ATM.

Figure 4B:
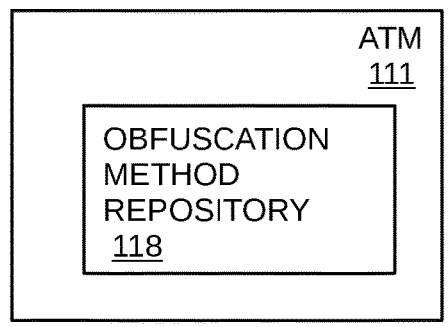
FIG. 4B is a block diagram of another further embodiment of the dynamic pre-boot hard disk encryption key management system of FIG. 1.

An alternative further embodiment of the banking system 100 of FIG. 1 is shown in FIG. 4B that can be used for ATMs having poor (or no) network connectivity. In such cases, network communication may be simply impossible. In this alternative further embodiment, a repository 118 of obfuscation methods are stored locally on the ATM 111. Every time the ATM 111 performs a boot into its operating system, the pre-boot manager randomly selects a new obfuscation method for use in obfuscating the KEK from the repository 118. The repository 118 may be used alone, i.e., for standalone ATMs with no network connectivity, or in conjunction with the embodiment of FIG. 4A. In this latter case, if no response is provided by the monitoring server 150 due to, for example, network connectivity problems, ATM 111 can then retrieve a random one of the obfuscation methods stored locally in repository 118. The obfuscation methods stored repository 118 can be edited (e.g., deleted or modified), locally or remotely, in the event that any one of the obfuscation methods becomes compromised.

The further embodiments shown in FIGS. 4A and 4B provide the ability to access a plurality of obfuscation algorithms in a randomized order from either a server or a local repository. These embodiments provide a secure way to protect a network of ATMs without a large bandwidth requirement. These embodiments ensure that the compromise of one of the obfuscation algorithms would not cause the entire network of ATMs to be compromised, since the random nature of the selection of the obfuscation algorithms would ensure that each ATM in the network would be likely using a different obfuscation algorithm.

Figure 5:
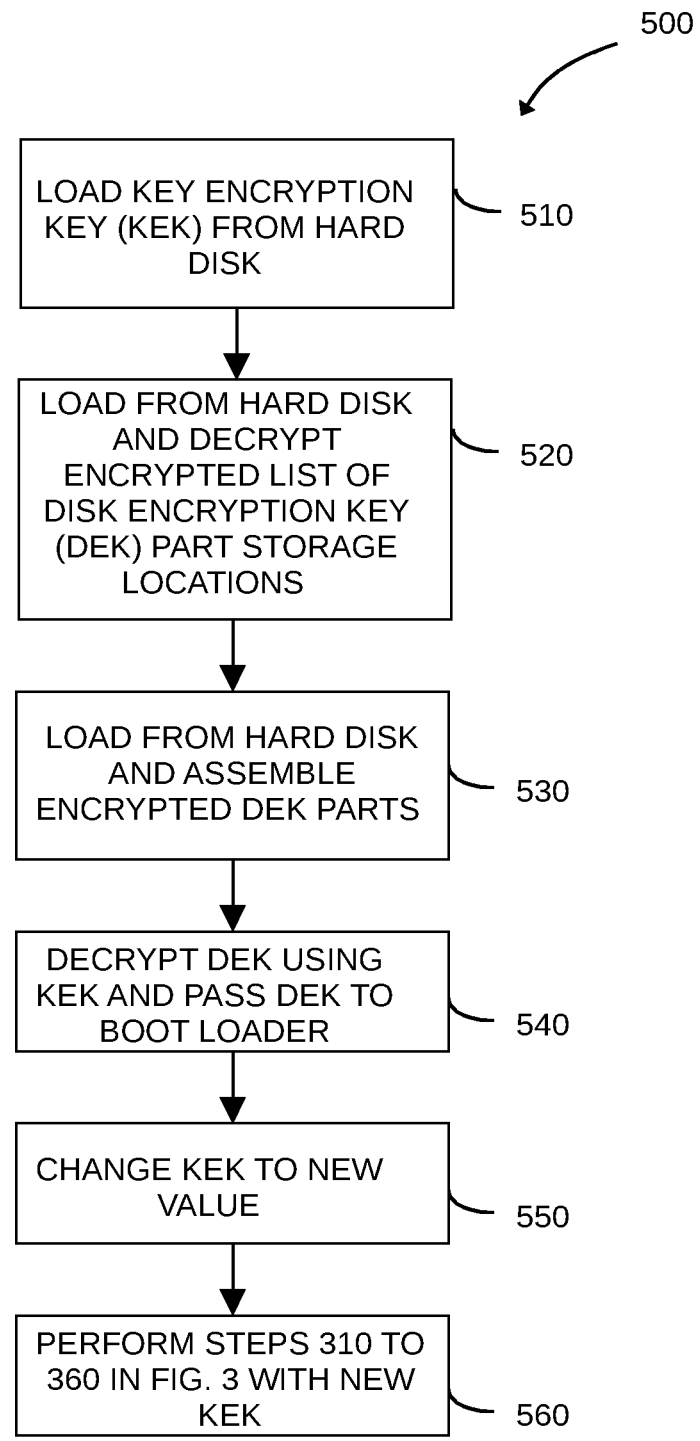
FIG. 5 is a flowchart of a method for booting the dynamic pre-boot hard disk encryption key management system of FIG. 1.

Referring now to FIG. 5, a flowchart 500 is shown of a method for booting the ATM from the hard disk performed by the dynamic pre-boot hard disk encryption key management system (pre-boot manager) of the present disclosure. At a first step 510, the KEK is loaded from the hard disk. The KEK may be loaded from a single predetermined location on the hard disk and need to be un-obfuscated. In one alternative, the KEK may be stored in parts in predetermined locations and need to be assembled and then un-obfuscated. In another alternative, the KEK may be stored in parts in randomized locations which are stored on a list also stored on the hard disk. In this alternative, the list must be loaded first, un-obfuscated, and then used to load the KEK parts, assemble the KEK and then un-obfuscate the KEK. Next, the list of encrypted DEK part locations is loaded from the hard disk and decrypted using the KEK at step 520. The decrypted list is then used to load from the hard disk and assemble the encrypted DEK parts at step 530. The assembled encrypted DEK parts are decrypted at step 540 using the KEK. The DEK, now decrypted, is passed to the boot loader or the pre-boot manager at step 540 to allow the operating system to be decrypted into volatile memory using the DEK. The KEK is optionally changed to a new value at step 550, and then steps 310 to 360 from FIG. 3 are performed at step 560 based on the new KEK value. Changing the KEK and storing the encrypted DEK parts in different locations upon every boot adds further layers of security against bad actors attempting to gain access to the DEK. Furthermore, as explained with respect to FIGS. 4A and 4B above, the method of obfuscation performed on the KEK (at step 560, when step 360 from FIG. 3 is repeated during each boot process) may be changed to randomly obtained new method which is received either remotely from a repository 155 on a monitoring server 150 or locally (in cases of low or no bandwidth) from a local repository 118.

The system and method of the present disclosure makes automating an attack much more difficult than traditional standalone hard disk encryption solutions, given that there is a moving target for the location of the two encryption keys, with the target moving upon every reboot of the terminal. In addition, this system and method significantly increases the effort required by an attacker to automate an attack upon multiple standalone machines by making them more secure by extension since there are multiple hard disk encryption solutions that can change a key after each boot.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of securely storing a disk encryption key for a hard disk at a terminal, comprising:
   encrypting, by a pre-boot manager running on a processor, a disk encryption key with a key encryption key;
   splitting, by the pre-boot manager, the encrypted disk encryption key into a plurality of encrypted disk encryption key parts;
   storing, by the pre-boot manager, the plurality of encrypted disk encryption key parts in randomized storage locations on an unallocated portion of a hard disk;
   encrypting, by the pre-boot manager, a list of the randomized storage locations of the plurality of encrypted disk encryption key parts with the key encryption key and storing the encrypted list in a location on the unallocated portion of the hard disk; and
   storing, by the pre-boot manager, the key encryption key split into a plurality of parts in a plurality of locations on the unallocated portion of the hard disk, wherein each of the plurality of locations is determined on a randomized basis and recorded on a key encryption key part list.

2. The method of claim 1, further comprising:
   obtaining, by the pre-boot manager, an obfuscation format randomly from a repository of multiple obfuscation formats; and
   prior to storing the key encryption key on the unallocated portion of the hard disk, obfuscating, by the pre-boot manager, the key encryption key using the obfuscation format.

3. The method of claim 1, further comprising:
   obtaining, by the pre-boot manager, an obfuscation format randomly from a repository of multiple obfuscation formats;
   obfuscating, by the pre-boot manager, the key encryption key part list using the obfuscation format; and
   storing, by the pre-boot manager, the obfuscated key encryption key part list on the unallocated portion of the hard disk.

4. The method of claim 1, wherein the unallocated portion of the hard disk is a partition of the hard disk that is not available to an operating system for the terminal.

5. A method for securely booting a terminal, comprising:
   loading, by a pre-boot manager running on a processor, a key encryption key from an unallocated portion of a hard disk;

loading, by the pre-boot manager, an encrypted list of disk encryption key part storage locations from the unallocated portion of the hard disk;

decrypting, by the pre-boot manager, the encrypted list of disk encryption key part storage locations using the key encryption key;

loading and assembling, by the pre-boot manager, the disk encryption key parts from the storage locations on the unallocated portion of the hard disk identified in the decrypted encrypted list of disk encryption key part storage locations;

decrypting, by the pre-boot manager, the encrypted disk encryption key using the key encryption key;

passing the decrypted disk encryption key from the pre-boot manager to the boot loader to enable the terminal to boot from a partition of the hard disk encrypted using the disk encryption key;

changing, by the pre-boot manager, the key encryption key to a new key encryption key;

encrypting, by the pre-boot manager, the disk encryption key with the new key encryption key to generate a new encrypted disk encryption key;

splitting, by the pre-boot manager, the new encrypted disk encryption key into a plurality of new encrypted disk encryption key parts;

storing, by the pre-boot manager, the plurality of new encrypted disk encryption key parts in randomized storage locations on the unallocated portion of the hard disk;

encrypting, by the pre-boot manager, a new list of the randomized storage locations of the plurality of new encrypted disk encryption key parts with the new key encryption key and storing the encrypted new list in a location on the unallocated portion of the hard disk; and storing, by the pre-boot manager, the new key encryption key on the unallocated portion of the hard disk.

6. The method of claim 5, further comprising:
obtaining, by the pre-boot manager, an obfuscation format randomly from a repository of multiple obfuscation formats; and prior to storing the new key encryption key on the unallocated portion of the hard disk, obfuscating, by the pre-boot manager, the new key encryption key using the obfuscation format.

7. The method of claim 5, wherein the step of storing, by the pre-boot manager, the new key encryption key on the unallocated portion of the hard disk comprises storing the new key encryption key split into a plurality of parts in a plurality of locations on the unallocated portion of the hard disk.

8. A system for securing a disk encryption key at a terminal, comprising:
a processor; and
a hard disk including executable instructions in an allocated portion thereof;
wherein the executable instructions when executed by the processor from the hard disk cause the processor to:
encrypt a disk encryption key with a key encryption key;
split the encrypted disk encryption key into a plurality of encrypted disk encryption key parts;
store the plurality of encrypted disk encryption key parts in randomized storage locations on an unallocated portion of the hard disk;
encrypt a list of the randomized storage locations of the plurality of encrypted disk encryption key parts with the key encryption key and storing the encrypted list in a location on the unallocated portion of the hard disk; and
store the key encryption key split into a plurality of parts in a plurality of locations on the unallocated portion of the hard disk, wherein each of the plurality of locations is determined on a randomized basis and recorded on a key encryption key part list.

9. The system of claim 8, wherein the executable instructions when executed by the processor from the hard disk cause the processor to:
obtain an obfuscation format randomly from a repository of multiple obfuscation formats; and
prior to storing the key encryption key on the unallocated portion of the hard disk, obfuscate the key encryption key using the obfuscation format.

10. The system of claim 8, wherein the executable instructions when executed by the processor from the hard disk cause the processor to store the key encryption key part list on the unallocated portion of the hard disk.

11. The system of claim 8, wherein the unallocated portion of the hard disk is a partition of the hard disk that is not available to an operating system for the terminal.

12. The system of claim 8, wherein the executable instructions when executed by the processor from the hard disk cause the processor to:
load a key encryption key from the unallocated portion of the hard disk;
load the encrypted list of disk encryption key part storage locations from the unallocated portion of the hard disk;
decrypt the encrypted list of disk encryption key part storage locations using the key encryption key;
load and assemble the disk encryption key parts from the storage locations on the unallocated portion of the hard disk identified in the decrypted list of disk encryption key part storage locations;
decrypt the encrypted disk encryption key using the key encryption key; and
pass the decrypted disk encryption key from the pre-boot manager to the boot loader to enable the terminal to boot from a partition of the hard disk encrypted using the disk encryption key.

13. The system of claim 12, wherein the executable instructions when executed by the processor from the hard disk cause the processor to:
change the key encryption key to a new key encryption key;
encrypt the disk encryption key with the new key encryption key to generate a new encrypted disk encryption key;
split the new encrypted disk encryption key into a plurality of new encrypted disk encryption key parts;
store the plurality of new encrypted disk encryption key parts in randomized storage locations on the unallocated portion of the hard disk;
encrypt a new list of the randomized storage locations of the plurality of new encrypted disk encryption key parts with the new key encryption key and store the encrypted new list in a location on the unallocated portion of the hard disk; and
store the new key encryption key on the unallocated portion of the hard disk.

14. The system of claim 13, wherein the executable instructions when executed by the processor from the hard disk cause the processor to:
obtain a new obfuscation format randomly from a repository of multiple obfuscation formats; and prior to storing the new key encryption key on the unallocated portion of the hard disk, obfuscate the new key encryption key using the new obfuscation format.

15. The system of claim 13, wherein executable instructions when executed by the processor from the hard disk cause the processor to store the new key encryption key on the unallocated portion of the hard disk by storing the new key encryption key split into a plurality of parts in a plurality of locations on the unallocated portion of the hard disk.

* * * * *